(12) United States Patent
Park et al.

(10) Patent No.: US 7,356,097 B2
(45) Date of Patent: Apr. 8, 2008

(54) APPARATUS AND METHOD FOR DETECTING BINARY DATA

(75) Inventors: Hyun-soo Park, Seoul (KR); Jae-seong Shim, Seoul (KR); Jae-wook Lee, Gyeonggi-do (KR); Eing-seob Cho, Yongin-si (KR); Eun-jin Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 10/870,445

(22) Filed: Jun. 18, 2004

(65) Prior Publication Data

US 2005/0025261 A1 Feb. 3, 2005

(30) Foreign Application Priority Data

Jun. 19, 2003 (KR) ............... 10-2003-0039891
May 25, 2004 (KR) ............... 10-2004-0037259

(51) Int. Cl.
   *H03D 1/00* (2006.01)
(52) U.S. Cl. .............. 375/341; 375/262; 714/795
(58) Field of Classification Search ........... 375/262, 375/261, 260, 259, 341, 340, 316, 354, 359, 375/377; 704/242, 236, 231, 200; 714/795, 714/786, 746, 699
See application file for complete search history.

(56) References Cited

U.S. PATENT DOCUMENTS 5,661,709 A * 8/1997 Takagi et al. ............ 369/59.22
5,727,032 A * 3/1998 Jamal et al. ............... 375/347
6,477,125 B1   11/2002 Hayami

FOREIGN PATENT DOCUMENTS

CN         1288567 A      3/2001

OTHER PUBLICATIONS

Office Action issued in Chinese Patent Application No. 200410048295.6 on Feb. 9, 2007.

* cited by examiner

*Primary Examiner*—Temesghen Ghebretinsae
(74) *Attorney, Agent, or Firm*—Stein, McEwen & Bui, LLP (57) ABSTRACT

A method and apparatus detecting binary data, the apparatus includes an analog-to-digital (AD) converter converting the input analog signal into a digital signal; at least one binarization unit converting the digital signal into binary data; a viterbi decoder performing viterbi decoding to detect binary data from the digital signal; and a level detector receiving the digital signal, receiving at least two binary data from one of the viterbi decoder and the at least one binarization unit, and detecting and outputting a level value for the viterbi decoding from the digital signal when a number of the at least two binary data, which correspond to each other on a time axis and have the same values, is equal to or greater than a predetermined number. Accordingly, it is possible to more precisely detect binary data from an analog signal.

29 Claims, 11 Drawing Sheets

(●: SAMPLING POINT, △: AVERAGE VALUE)

FIG. 2B

(●: SAMPLING POINT, △: AVERAGE VALUE)

FIG. 3A

(●: SAMPLING POINT)

FIG. 3B (●: SAMPLING POINT)

FIG. 4

SAMPLING POINT THAT REQUIRES COMPENSATION

APPARATUS AND METHOD FOR DETECTING BINARY DATA

CROSS-REFERENCE TO RELATED APPLICATIONS

This application claims the priorities of Korean Patent Application No. 2003-39891, filed on Jun. 19, 2003, and Korean Patent Application No. 2004-37259, filed on May 25, 2004, in the Korean Intellectual Property Office, the disclosures of which are incorporated herein by reference.

BACKGROUND OF THE INVENTION

1. Field of the Invention

The present invention relates to an apparatus and method of detecting binary data, and more particularly, to an apparatus and method of precisely detecting binary data from an analog signal.

2. Description of the Related Art

An optical disc is a data storage medium, and an optical disc drive generates an electrical signal whose intensity is proportional to that of a beam reflected from the optical disc. The electrical signal is referred to as a radio frequency (RF) signal. The optical disc drive detects binary data recorded on the optical disc from the RF signal.

The RF signal detected from the binary data assumes the property of an analog signal according to the optical disc and optical characteristics. A viterbi decoder, which is one of binarization units, is required to detect the binary data from the analog signal.

However, as data recording density of an optical disc increases, the quality of an RF signal reproduced from the optical disc for detecting binary data deteriorates. Also, the shape of a pit (or a mark) recorded on the optical disc may vary according to the quality of an optical disc, thus causing a deviation between reproduced data.

SUMMARY OF THE INVENTION

According to an aspect of the present invention, there is provided an apparatus for precisely detecting binary data from an analog signal.

According to an aspect of the present invention, there is also provided a method of precisely detecting binary from an analog signal.

According to one aspect of the present invention, there is provided an apparatus detecting binary data from an input analog signal, the apparatus including an analog-to-digital (AD) converter converting the input analog signal into a digital signal; at least one binarization unit receiving the digital signal and outputting a first type and a second type of binary data; a viterbi decoder decoding the digital signal and outputting a third type of binary data; and a level detector receiving at least two of the types of binary data, synchronizing the at least two types of binary data and outputting a level value to the viterbi decoder when an output number of the synchronized at least two types of binary data, which correspond to each other on a time axis and have same values, is equal to or greater than a predetermined number.

According to another aspect of the present invention, there is provided a method of detecting binary data from an input analog signal, the method including converting the input analog signal into a digital signal; binarizing the digital signal into first binary data; performing viterbi decoding to detect second binary data from the digital signal; receiving the digital signal, and the first and second binary data, and detecting a level value for the viterbi decoding when an output number from synchronizing the first and second binary data, is equal to or greater than a predetermined number.

According to yet another aspect of the present invention, there is provided a method of detecting binary data from an input analog signal, the method including converting the input analog signal into a digital signal; binarizing the digital signal into first binary data; binarizing the digital signal into second binary data; receiving the digital signal, and the first and second binary data, and detecting a level value for viterbi decoding from the digital signal when an output number of the first and second binary data, which correspond to each other on a time axis and have same values, are equal to or greater than a predetermined number; and performing the viterbi decoding to detect the second binary data from the digital signal, using the detected level value.

According to another aspect of the present invention, there is provided a computer readable recording medium storing a program that executes a method of detecting binary data from an input analog signal, the method including converting the input analog signal into a digital signal; binarizing the digital signal into first binary data; performing viterbi decoding to detect second binary data from the digital signal; receiving the digital signal, and the first and second binary data, and detecting a level value for the viterbi decoding from the digital signal when a number obtained by synchronizing the first and second binary data, is equal to or greater than a predetermined value.

According to another aspect of the present invention, there is provided a computer readable recording medium storing a program that executes a method of detecting binary data from an input analog signal, the method including converting the input analog signal into a digital signal; binarizing the digital signal into first binary data; binarizing the digital signal into second binary data; receiving the digital signal, and the first and second binary data, and detecting a level value for viterbi decoding from the digital signal when a number obtained by synchronizing the first and second binary data is equal to or greater than a predetermined number; and performing the viterbi decoding to detect the second binary data from the digital signal, using the detected level value.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
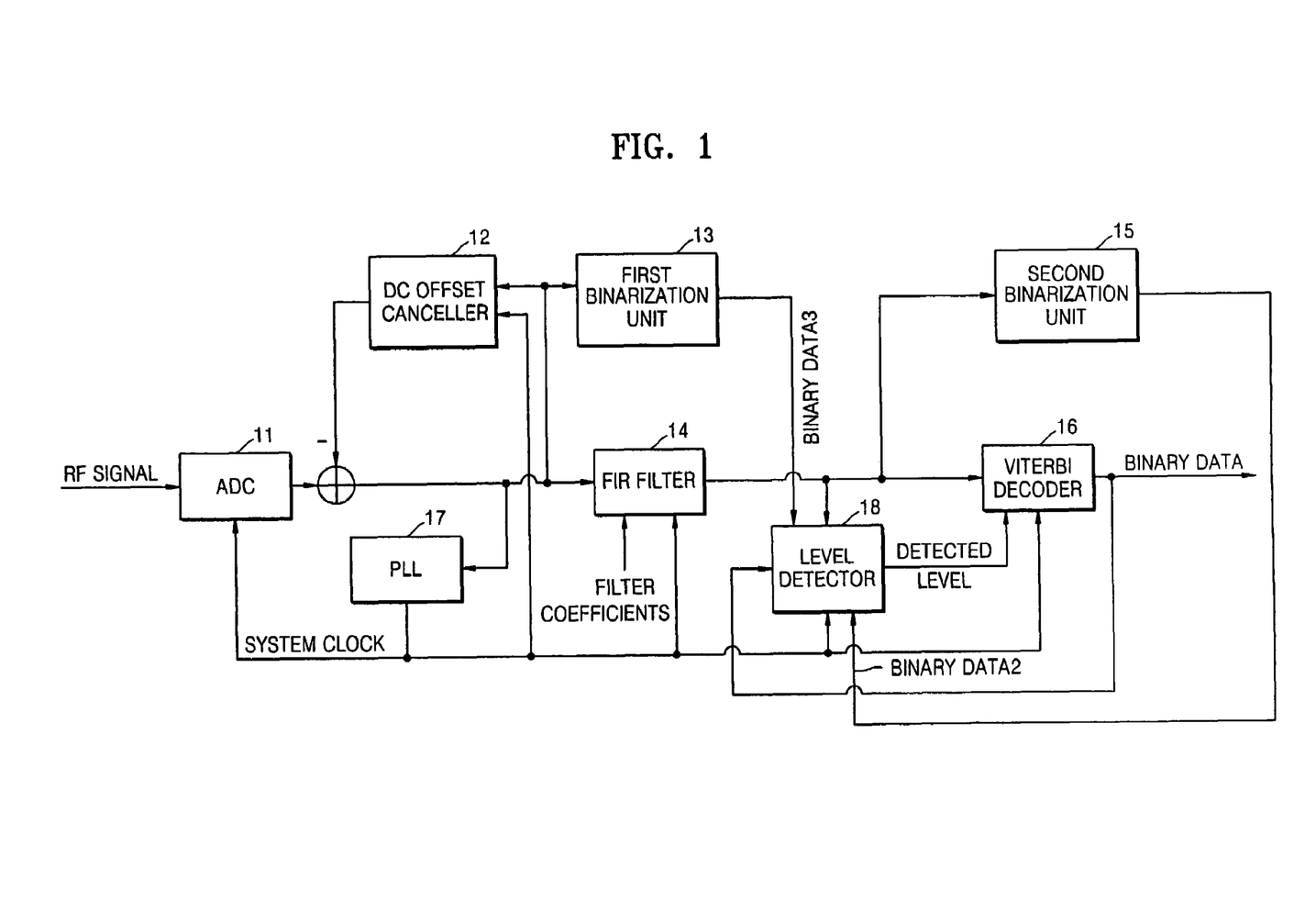
FIG. 1 is a block diagram of a binary data detecting apparatus according to an embodiment of the present invention.

FIG. 1 is a block diagram of a binary data detecting apparatus according to an embodiment of the present invention. The apparatus of FIG. 1 includes an analog-to-digital converter (ADC) 11, a DC offset canceller 12, a first binarization unit 13, a finite impulse response (FIR) filter 14, a second binarization unit 15, a viterbi decoder 16, a phase lock loop (PLL) 17, and a level detector 18.

The ADC 11 converts a radio frequency (RF) signal into a digital signal. The ADC 11 outputs a digital signal obtained by sampling the RF signal for a predetermined period, rather than a binary signal.

The DC offset canceller 12 receives the output digital signal from the ADC 11 and cancels a DC offset value therefrom, and outputs a DC offset digital signal. The DC offset digital signal is input to the first binarization unit 13, the FIR filter 14, and the PLL 17.

In this embodiment, the DC offset canceller 12 cancels the DC offset from the digital signal output from the ADC 11, based on a fact that data is generated such that a digital sum value (DSV) of an input signal is 0.

The PLL 17 generates a system clock. Specifically, the PLL 17 receives the DC offset digital signal, from the ADC 11, calculates a phase offset between the DC offset digital signal and a current system clock, and changes the system clock so that the phase offset becomes 0, thereby synchronizing the digital signal output from the ADC 11 with the system clock.

The first binarization unit 13 receives the DC offset digital signal, from the DC offset canceller 12, and outputs binary data 3. The second binarization unit 13 receives a signal output from the FIR filter 14 and outputs binary data 2.

The type of the first or second binarization unit 13 or 15 is not limited to the types referred to in these embodiments. For instance, the first or second binarization unit 13 or 15 may be a run-length compensator. When a signal, which is not in conformance with a coding rule, is included in input signals, the run-length compensator enforcedly compensates for the signal according to the coding rule. In general, codes (2,10) and (1,7) are mainly used in an optical disc. In the case of the code (2,10), a signal with a period of 3T that is three times more than a period of a basic pit is a signal with the shortest period, where T denotes a unit period or a length of a pit. In the case of the code (1,7), a signal with 2T that is twice more than the period of the basic pit is a signal with the shortest period.

Therefore, when data normally recorded on the optical disc using the code (2,10), it is impossible to detect a signal with a period of 2T or 1T since it is smaller than the period of 3T. Likewise, when data recorded on the optical disc using the code (1,7), it is impossible to detect a signal with the period of 1T since it is smaller than the period of 2T.

Figure 2A:
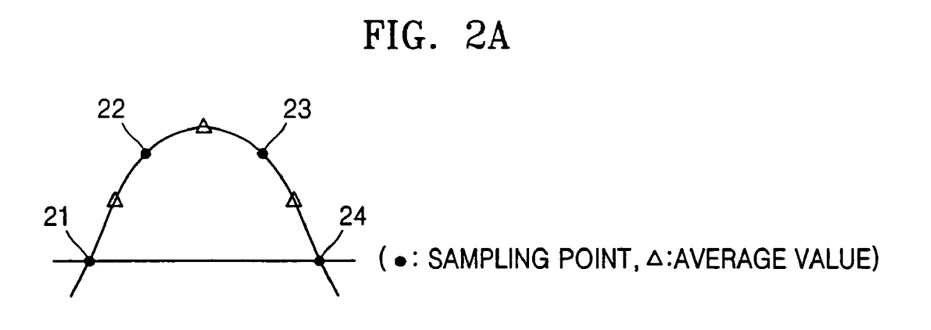
FIG. 2A illustrates a waveform diagram of a signal with a period of 3T, the signal being normally detected when data is recorded using code (2,10)

FIG. 2A illustrates a waveform diagram of a signal with a period of 3T, the signal being normally detected when data is recorded using the code (2,10). A sign of an average value of sampled signals determines whether the period of a signal is 3T. In FIGS. 2A, 21, 22, 23, and 24 denote sampling points, and respective triangularities denote average values of the sampling points 21 and 22, the sampling points 22 and 23, and the sampling points 23 and 24. Referring to FIG. 2A, signs of all the average values of the sampling points 21 and 22, 22 and 23, and 23 and 24 are positive. Accordingly, the periods of the signals of FIG. 2A can be determined to be 3T.

Figure 2B:
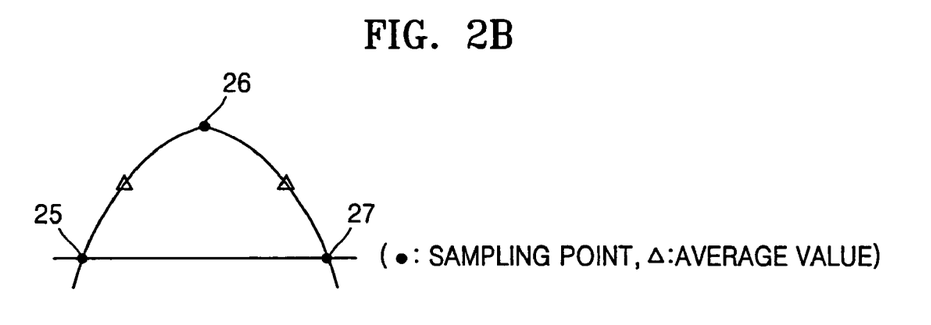
FIG. 2B illustrates a waveform diagram of a signal with a period of 2T, the signal being normally detected when data is recorded using code (1,7)

FIG. 2B illustrates a waveform diagram of a signal with a period of 2T, the signal being normally detected when data is recorded using the code (1,7). As described above, the signs of all average values of sampled signals determines whether the period of a signal is 2T. Referring to FIG. 2B, signs of all the average values of sampling points 25 and 26, and sampling points 26 and 27 are positive. Accordingly, the periods of the signals of FIG. 2B can be determined to be 2T.

However, when an input signal contains noise, the noise distorts sampled signals, thus causing an error in signal detection.

Figure 3A:
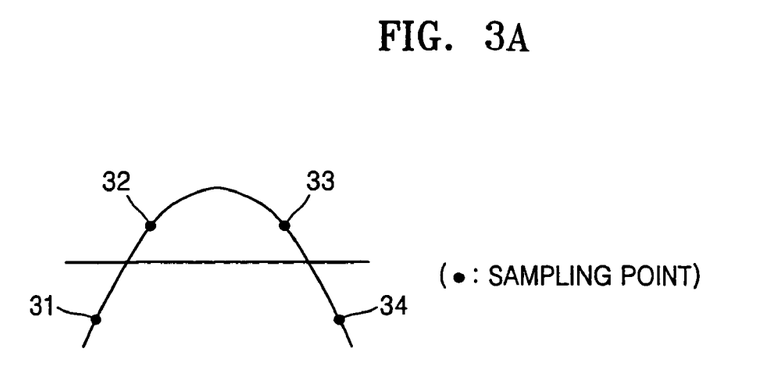
FIG. 3A illustrates an example of a waveform diagram of a signal with a period of 3T, the signal being distorted due to noise when data is recorded using the code (2,10)

FIG. 3A illustrates an example of a waveform diagram of a signal with a period of 3T, the signal being distorted due to noise when data is recorded using the code (2,10). Referring to FIG. 3A, an average value of sampling points 31 and 32 has a negative sign, an average value of sampling points 32 and 33 has a positive sign, and an average value of sampling points 33 and 34 has a negative sign. In this case, the period of the signal of FIG. 3A is erroneously determined as 1T.

Figure 3B:
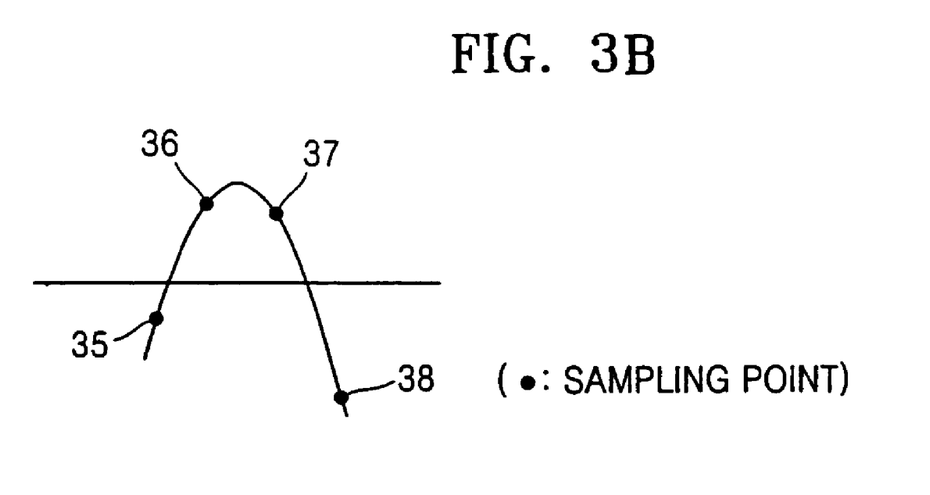
FIG. 3B illustrates another example of a waveform diagram of a signal with a period of 3T, the signal being distorted due to noise when data is recorded using the code (2,10)

FIG. 3B illustrates another example of a waveform diagram of a signal with a period of 3T, the signal being distorted due to noise when data is recorded using the code (2,10). Referring to FIG. 3B, an average value between sampling points 35 and 36 has a positive value, an average value between sampling points 36 and 37 has a positive value, and an average value between sampling points 37 and 38 has a negative value. In this case, the period of the signal of FIG. 3B is erroneously determined as 2T.

Accordingly, the distorted signals of FIGS. 3A and 3B must be compensated to appropriately detect binary signals from the distorted signals. In the compensation, an operation performed on a sampling point that needs to be compensated for is defined.

Figure 4:
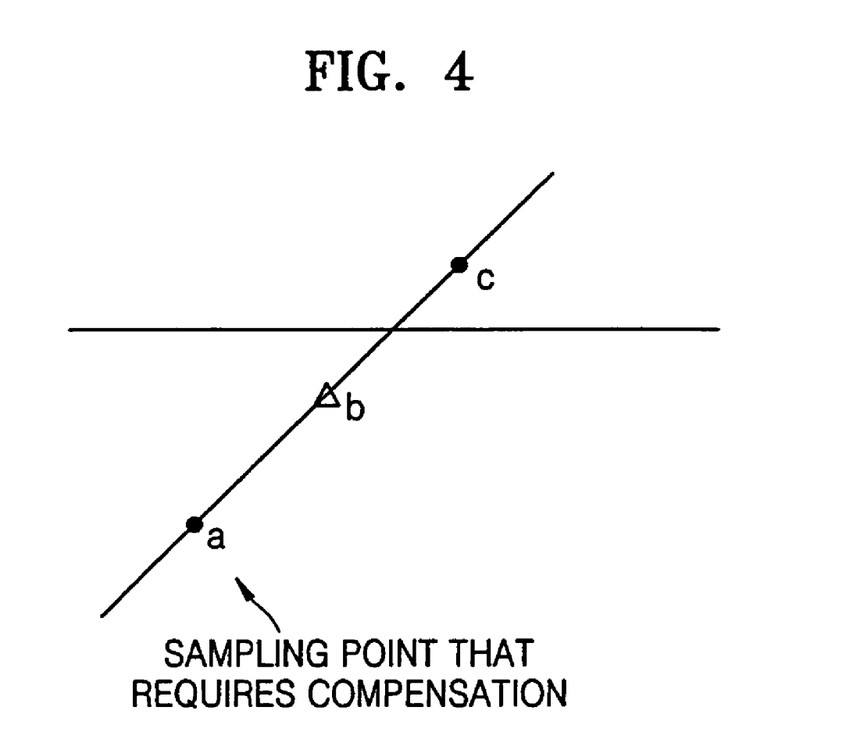
FIG. 4 is a reference diagram illustrating a method of compensating for a distorted signal according to an embodiment of the present invention.

FIG. 4 is a reference diagram illustrating a method of compensating a distorted signal according to an embodiment of the present invention. Referring to FIG. 4, when a denotes a sampling point that needs to be compensated, and c denotes another sampling point, an average value of the sampling points a and c is calculated using the following equation:

$$b=(a+c)/2 \quad (1)$$

A period T of a signal is determined by a sign of the average value b. Thus, when the sign of the average value b is erroneously determined, it must be corrected. There are various methods of changing the sign of the average value b. One of the various methods is to just reverse the sign of the average value b. In other words, a value b' having the same value as the average vale b but with opposite sign of the average value b, is applied, to Equation (1). In this case, the sampling point a that needs to be compensated is changed to a sampling point a' calculated using the following equation:

$$a'=-2b-c \quad (2)$$

Figure 5:
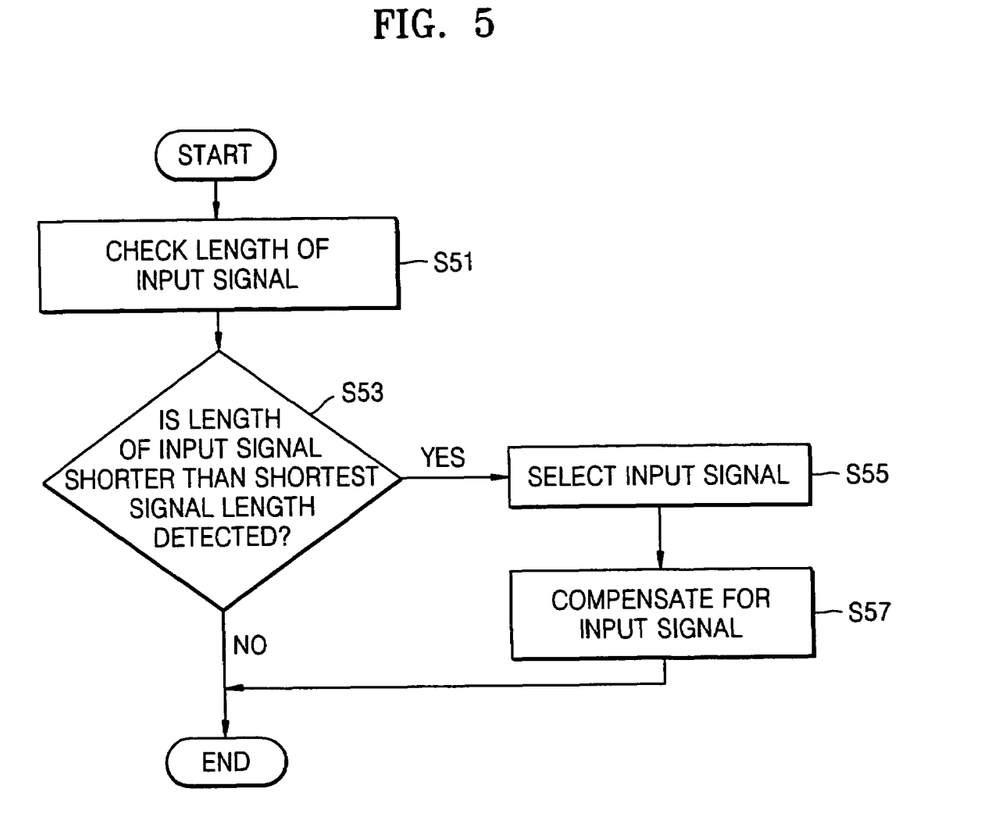
FIG. 5 is a flowchart illustrating a run-length compensation method according to an embodiment of the present invention.

FIG. 5 is a flowchart illustrating a run-length compensation method according to an embodiment of the present invention. Referring to FIGS. 1 and 5, the first or second binarization units 13 or 15 that perform the run-length compensation method, check a length of an input signal (S51). As described above, the sign of an average value of the sampling points determines the length of an input signal.

Thereafter, it is determined (S53) whether the input signal's length is shorter than the shortest signal length. When determined that the input signal's length is shorter than the shortest signal length, the input signal is selected (S55) and compensated using Equation (1), for example (S57).

The type of the first or second binarization unit 13 or 15 is not limited to the types referred to thin these embodiments. For instance, the binarization units may have only one of or both run-length compensation and binarization functions. If the first or second binarization units 13 or 15 has only the binarization function, it computes an average value of two input signals, determines a sign of the average value, and outputs bits of the sign as binary data. In this embodiment, if the first or second binarization units 13 or 15 can detect and output binary data from an input signal, its type or function is not limited.

Referring to FIG. 1, the FIR filter 14 improves the frequency characteristics of an input signal so that the input signal can be processed by the viterbi decoder 16.

Figure 6:
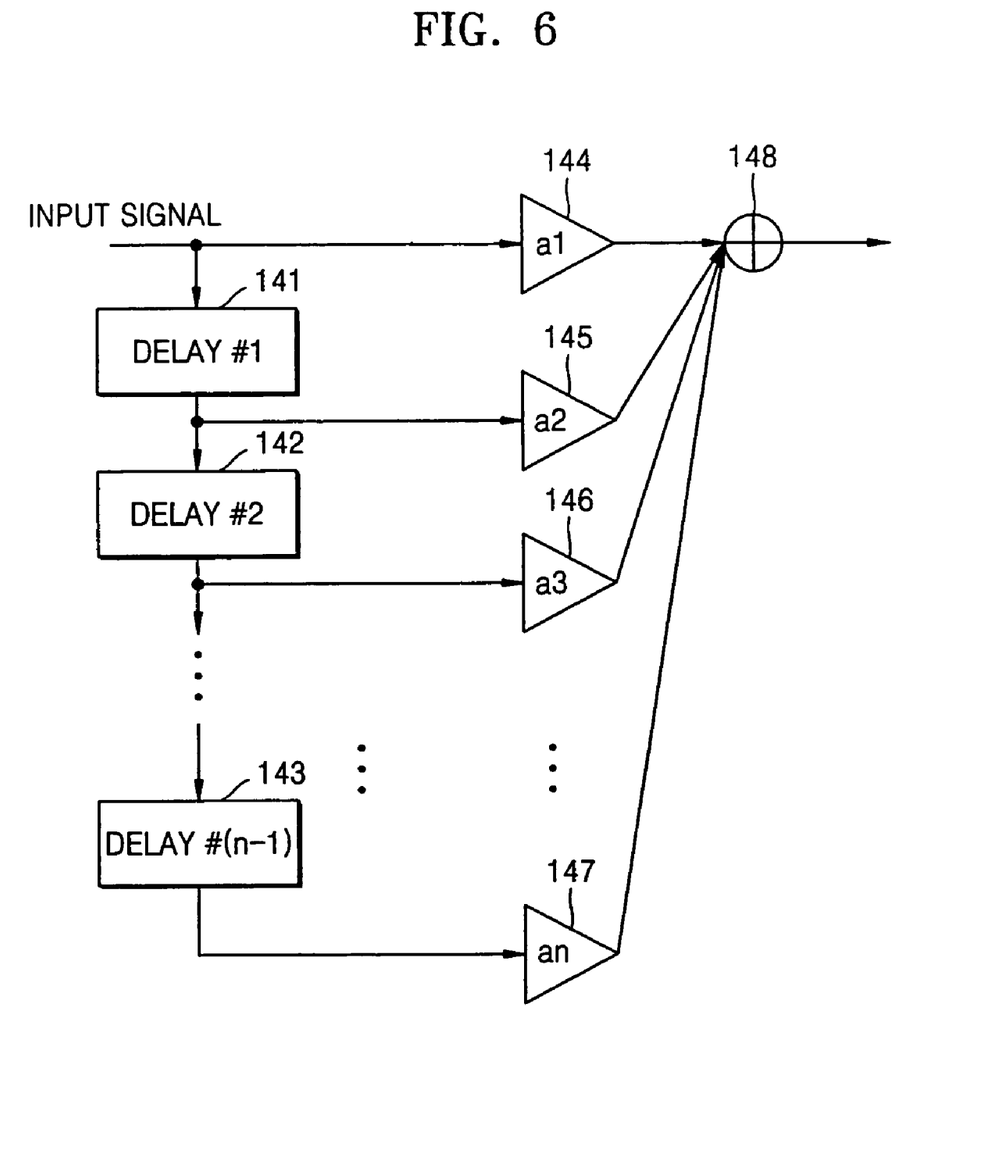
FIG. 6 is a block diagram of a FIR filter according to an embodiment of the present invention.

FIG. 6 is a block diagram of an embodiment of the FIR filter 14 of FIG. 1. The FIR filter 14 of FIG. 6 includes a plurality of delayers 141 through 143 that delay an input signal per system clock, a plurality of multipliers 144 through 147, and an adder 148 that combines outputs of the plurality of multipliers 144 through 147. Constants $a_1$ through $a_n$ of the plurality of multipliers 144 through 147 have a range of real numbers that includes 0. In this embodiment, constants $a_1$ through $a_n$ of the plurality of multipliers 144 through 147 are changed to obtain optimum signals from the FIR filter 14.

The viterbi decoder 16 detects optimum binary data using statistical characteristics of the input signal. Therefore, in the viterbi decoder 16, input signal levels are defined according to their characteristics, and the viterbi decoder 16 determines statistical characteristics of an input signal based on the defined signal levels and obtains binary data with a small error from the input signal.

In this embodiment, the binary data detecting apparatus further includes the level detector 18. The level detector 18 provides a level value of an optimum signal to the viterbi decoder 16. The level detector 18 determines level values of input signals and sends an average value of the level values to the viterbi decoder 16.

The level detector 18 is differently configured according to the code for an input signal and the type of the viterbi decoder 16. As previously mentioned, codes (2,10) and (1,7) are mainly used as the code for the input signal. In the case of the code (1,7), the shortest period 2T of a signal is twice than a basic period of a signal. In the case of the code (2,10), the shortest period 3T of a signal is three times than the basic period of a signal.

Different types of the viterbi decoder 16 are selected according to statistical characteristics of input signals. In general, an (a,b,a) type viterbi decoder, an (a,b,b,a) type viterbi decoder, and an (a,b,c,b,a) type viterbi decoder are mainly used.

Also, the binary data detecting apparatus according to this embodiment further includes the level detector 18 that more precisely determines a signal level value required to operate the viterbi decoder 16. The level detector 18 receives at least two types of binary data detected from an input analog signal, selects two types of the received binary data, and synchronizes the selected two types of binary data with each other. When a number of the two types of binary data values, that correspond to each other on a time axis and have the same values, is equal to or greater than a predetermined number, level values input to the viterbi decoder 16 are detected from the input signals.

If the two types of binary data on the time axis are equivalent to each other, they are considered as very reliable data, and thus, the level values are determined and input to the viterbi decoder 16. Since the determined level values are very reliable, the viterbi decoder 16 is capable of more precisely detecting binary data.

Figure 7:
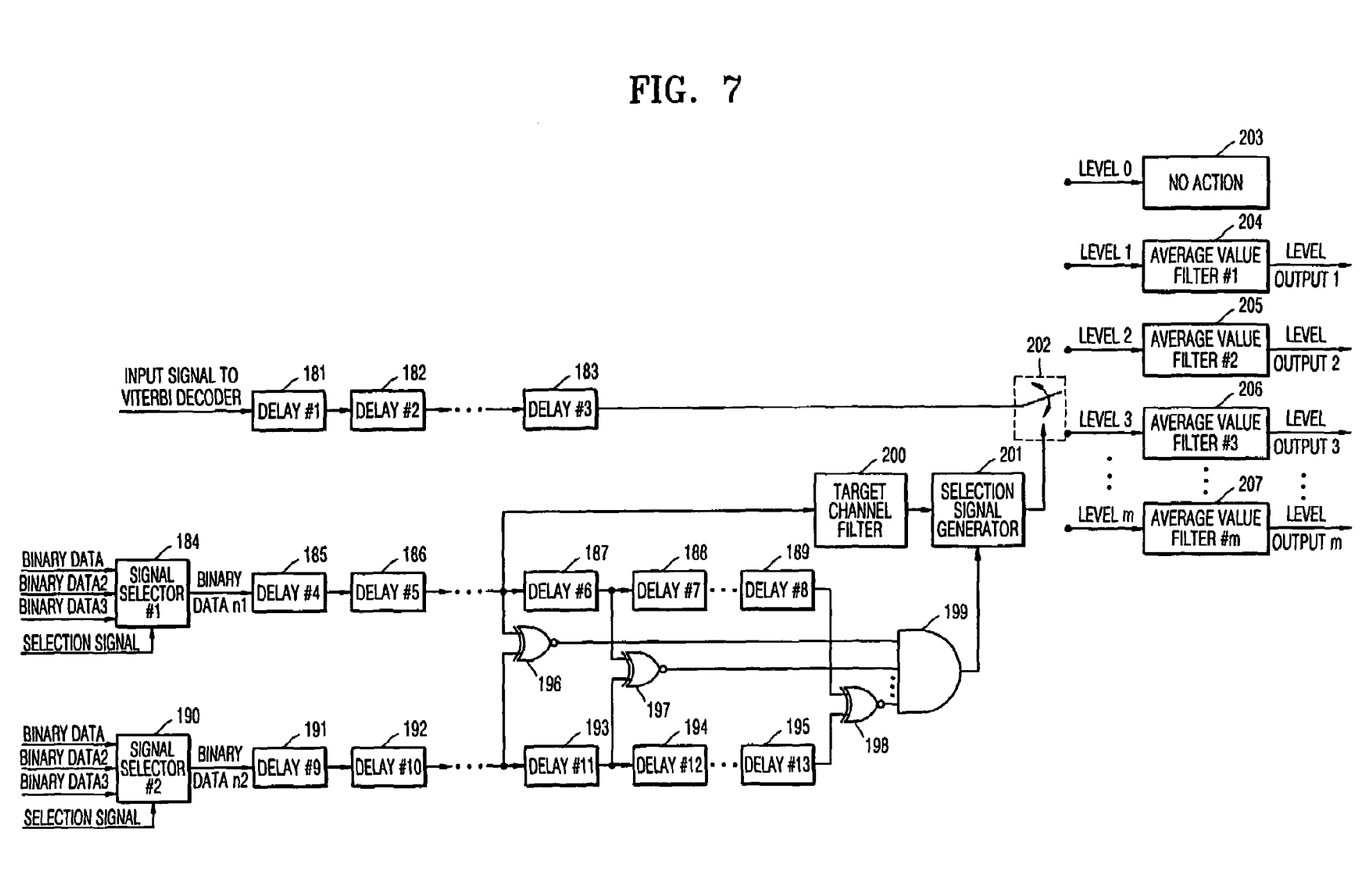
FIG. 7 is a block diagram of a level detector according to an embodiment of the present invention.

FIG. 7 is a block diagram of the level detector 18 of FIG. 1 according to an embodiment of the present invention. Referring to FIG. 7, signals input to the viterbi decoder 16 are also input to the level detector 18. The input signals to the viterbi decoder 16 are delayed by a plurality of delayers 181 through 183 for a predetermined time so as to synchronize the signals with one another, and the delayed signals are sent to a switch 202. The plurality of delayers 181 through 183 may be embodied as D-flip-flops.

Binary data output from the viterbi decoder 16, binary data 3 output from the first binarization unit 13, and binary data 2 output from the second binarization unit 15 are input to a first signal selector 184 and a second signal selector 190. The first signal selector 184 selects and outputs one of the binary data, the binary data 2, the and binary data 3 in response to a selection signal input from a microcomputer (not shown). An output of the first signal selector 184 is referred to as binary data n1.

Similarly, the second signal selector 190 selects and outputs one of the binary data, the binary data 2, and the binary data 3 in response to the selection signal input from the microcomputer. If an output of the second signal selector 190 is binary data n2, binary data n2 is preferably different from binary data n1.

In this embodiment, the binary data output from the viterbi decoder 16, the binary data 3 output from the first binarization unit 13, and the binary data 2 output from the second binarization unit 15 are input to the first and second signal selectors 184 and 190. However, the present invention is not limited by the above description. That is, when two types of binary data, which are compared with each other to determine whether a selection signal generator 201 is activated to operate, are output from the first and second signal selectors 184 and 190, respectively, their types are not limited.

Therefore, all the binary data output from the viterbi decoder 16, the binary data 3 output from the first binarization unit 13, and the binary data 2 output from the second binarization unit 15 are not always required to be input to the first and second signal selectors 184 and 190. For instance, the binary data output from the viterbi decoder 16 may be input to the first signal selector 184, and the binary data 3 output from the first binarization unit 13 may be input to the second signal selector 190. In this case, a binary data detecting apparatus according to this embodiment may not include the second binarization unit 15.

A signal with the smallest error rate is preferably selected, but not required, as binary data n1 output from the first signal selector 184. For this reason, the binary data output from the viterbi decoder 16 is preferably selected as the binary data n1 but this is not obligatory.

Binary data n2 output from the second signal selector 190 is preferably a signal with the highest error rate but this is not obligatory. Binary data n1 passes through a plurality of delayers 185, 186, . . . , 187, 188, . . . , 189 and binary data n2 also passes through a plurality of delayers 191, 192, . . . , 193, 194, . . . , 195 so that binary data n1 and binary data n2 can be synchronized with each other.

A plurality of logic units 196, 197, and 198 receive data values of the respective synchronized binary data n1 and binary data n2, and perform a not exclusive OR (NXOR) operation on these data values. A result of NXOR operation is illustrated in Table 1.

TABLE 1

| x | y | x NXOR y |
|---|---|----------|
| 0 | 0 | 1 |
| 0 | 1 | 0 |
| 1 | 0 | 0 |
| 1 | 1 | 1 |

As shown in Table 1, when input values are the same, the result of NXOR operation has a value of 1. When all the plurality of logic units 196 through 198 have an output value of 1, an OR logic unit 199 that performs an OR operation has an output value of 1, thus enabling the selection signal generator 201.

Binary data n1 is input to a target channel filter 200. When the data values of binary data n1 and binary data n2 are equal to or greater than a predetermined number, binary data n1 input to the target channel filter 200 is regarded as being highly reliable. In this case, the selection signal generator 201 is enabled to detect signal levels.

Figure 8A:
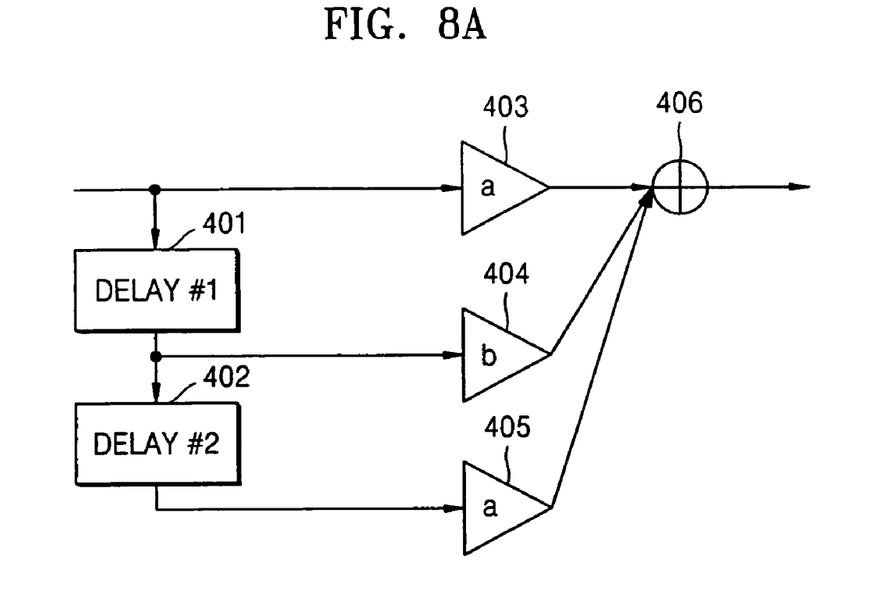
FIG. 8A is a block diagram of an (a,b,a) type target channel filter according to an embodiment of the present invention.
Figure 8B:
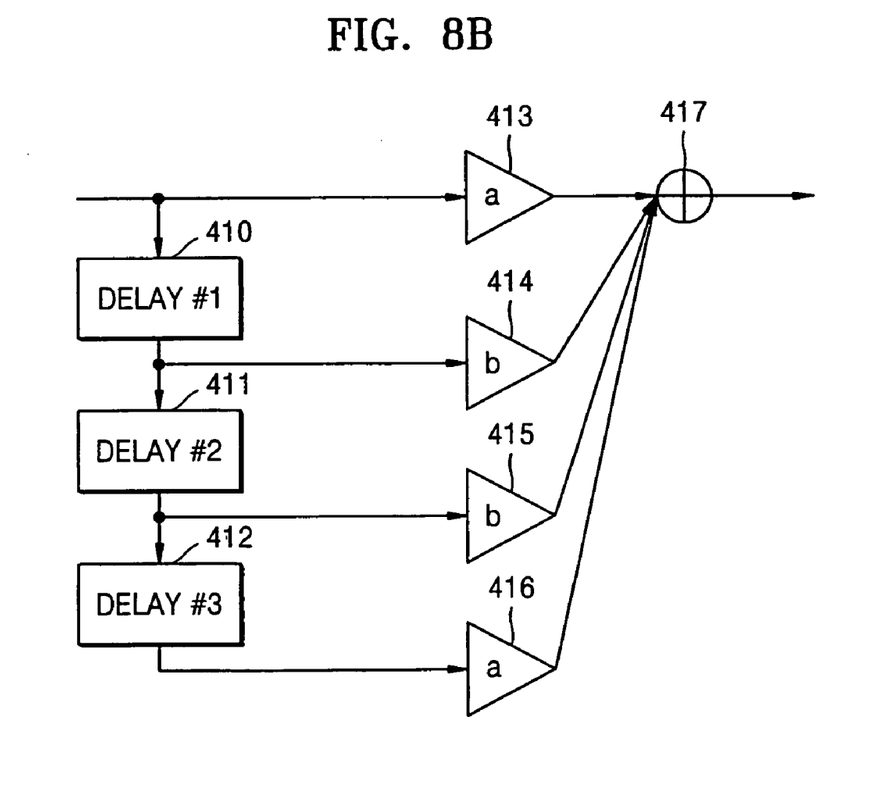
FIG. 8B is a block diagram of an (a,b,b,a) type target channel filter according to an embodiment of the present invention.
Figure 8C:
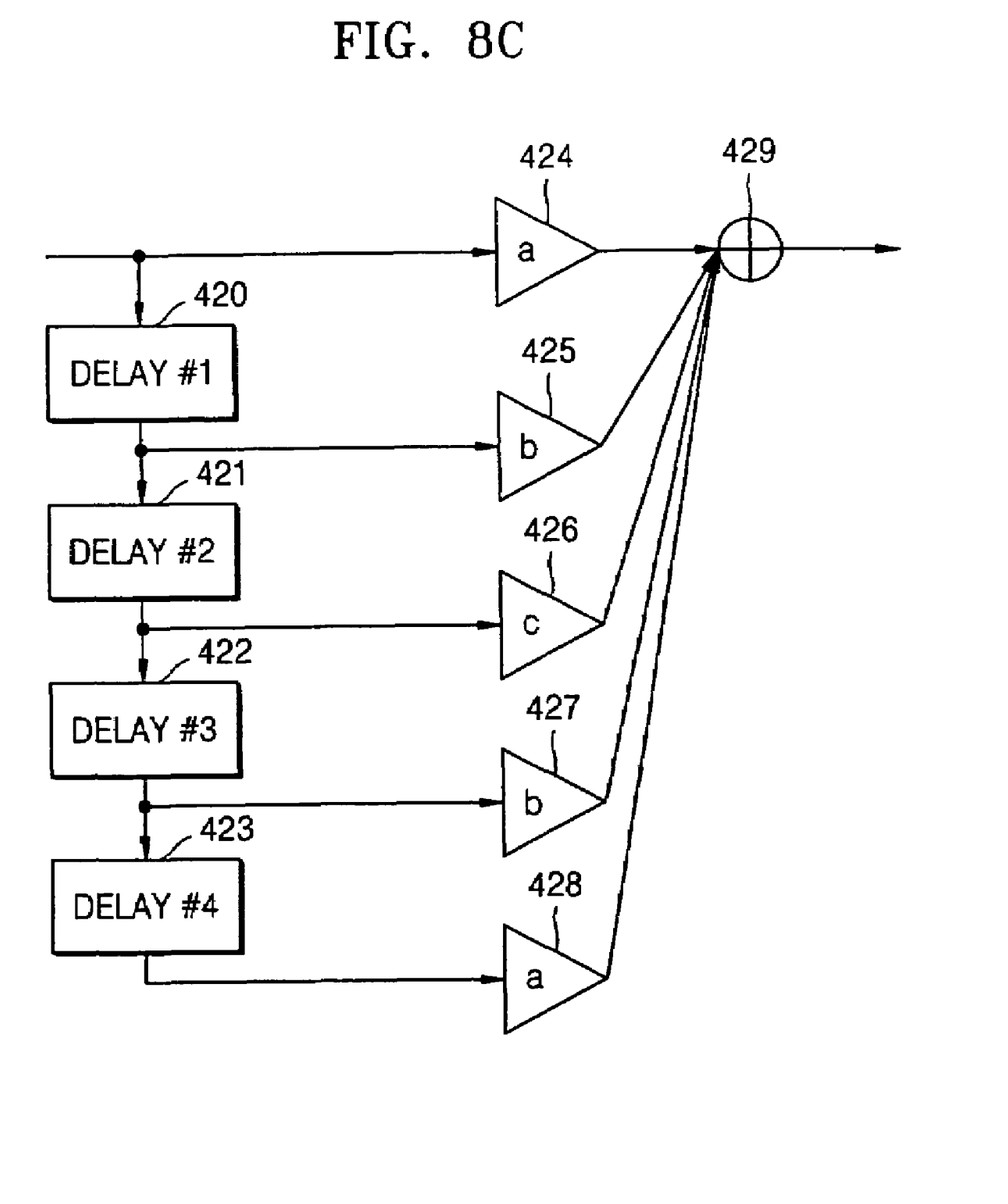
FIG. 8C is a block diagram of an (a,b,c,b,a) type target channel filter according to an embodiment of the present invention.

The target channel filter 200 may be a channel filter whose type is determined according to the type of the viterbi decoder 16. FIGS. 8A through 8C are block diagrams of embodiments of the target channel filter 200 according to the present invention.

More specifically, FIG. 8A illustrates an (a,b,a) type target channel filter, FIG. 8B illustrates an (a,b,b,a) type target channel filter, and FIG. 8C illustrates an (a,b,c,b,a) type target channel filter. In general, the (a,b,a) type target channel filter, the (a,b,b,a) type target channel filter, and the (a,b,c,b,a) type target channel filter are mainly used when reproducing data from an optical disc. After determining the type of the target channel filter 200, a circuit construction of the viterbi decoder 16 is determined. Here, a, b, and c are constants that are real numbers equal to or greater than 0. The target channel filters of FIGS. 8A through 8C will later be described in great detail.

When binary data is input to the target channel filter 200, several level values are determined according to code used in the binary data and the type of the target channel filter 200. The selection signal generator 201 generates selection signals using the level values output from the target channel filter 200 and controls the switch 202.

When an output of the target channel filter 200 reaches a predetermined level, the selection signal generator 201 outputs a selection signal corresponding to the predetermined level to the switch 202.

Figure 9:
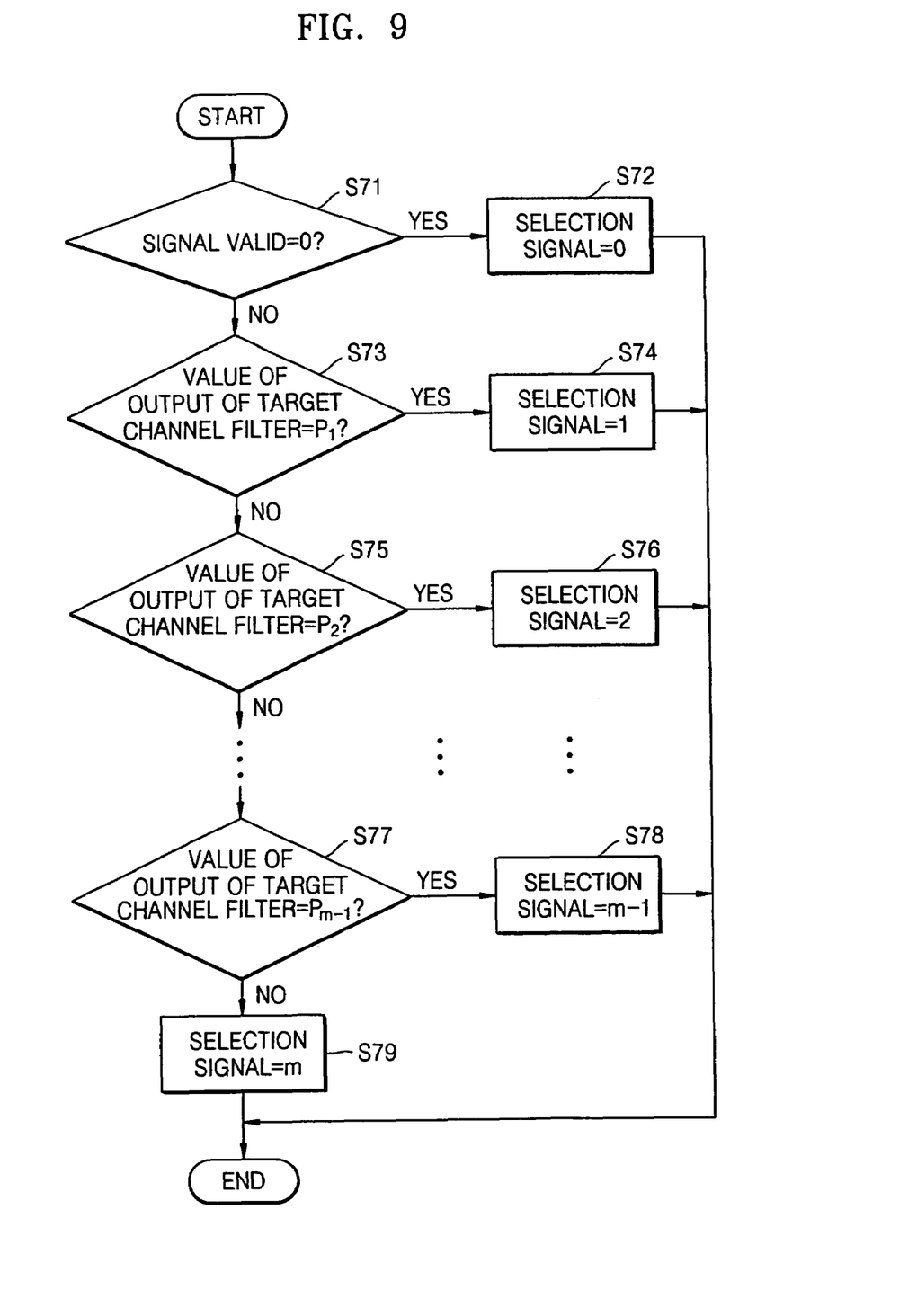
FIG. 9 is a flowchart illustrating an operation of a selection signal generator according to an embodiment of the present invention.

FIG. 9 is a flowchart illustrating the operation of the selection signal generator 201 according to an embodiment of the present invention. Referring to FIG. 9, the selection signal generator 201 determines whether a value of a signal valid is 0 (S71). The signal valid is an output of the OR logic unit 199. When a value of the signal valid is 0, the reliability of binary data n1 is low, and thus, the selection signal generator 201 generates a selection signal with a value of 0 and outputs it to the switch 202 (S72). When the selection signal with a value of 0 is input to the switch 202, the switch 202 does not detect a level of a signal input from the viterbi decoder 16.

When the selection signal generator 201 determines that the signal valid is a value other than 0, the selection signal generator 201 determines the level of the output of the target channel filter 200, and outputs a selection signal corresponding to the determined level to the switch 202.

Signal levels are defined according to the types of the target channel filter 200 and the code used. If the target channel filter 200 is the (a,b,a) type target channel filter of FIG. 8A and one of the code (1,7) and the code (2,10) is used, the target channel filter 200 outputs four level values of P1=2a+b, P2=b, P3=−b, and P4=−2a−b. One of the four level values is selected by a value input to a plurality of multipliers 403 through 405. For instance, the level value P1 is output from an adder 406 when a value of 1 is input to all of the plurality of multipliers 403 through 405. The level value P2 is output from the adder 406 when a value of 1 is input to the multiplier 403 with a multiplication constant a, a value of 1 is input to the multiplier 404 with a multiplication constant b, and a value of −1 is input to the multiplier 405 with a multiplication constant c, or when a value of −1 is input to the multiplier 403, a value of 1 is input to the multiplier 404, and a value of 1 is input to the multiplier 405.

If the target channel filter 200 is the (a, b, b, a) type target channel filter of FIG. 8B and the code (1,7) is used, the target channel filter 200 outputs seven level values of P1=2a+2b, P2=2b, P3=−2a+2b, P4=0, P5=2a−2b, P6=−2b, and P7=−2a−2b.

If the target channel filter 200 is the (a, b, b, a) type target channel filter of FIG. 8B and the code (2,10) is used, the target channel filter 200 outputs five level values of P1=2a+2b, P2=2b, P3=0, P4=−2b, and P5=−2a−2b.

If the target channel filter 200 is the (a, b, c, b, a) type target channel filter of FIG. 8C and the code (1,7) is used, the target channel filter 200 outputs ten level values of P1=2a+2b+c, P2=2b+c, P3=−2a+2b+c, P4=c, P5=−2a+c, P6=2a−c, P7=−c, P8=2a−2b−c, P9=−2b−c, and P10=−2a−2b−c.

Lastly, if the target channel filter 200 is the (a, b, c, b, a) type target channel filter of FIG. 8C and the code (2,10) is used, the target channel filter 200 outputs eight level values of P1=2a+2b+c, P2=2b+c, P3=−2a+2b+c, P4=c, P5=−c, P6=2a−c, P7=−2b−c, and P8=−2a−2b−c.

In this embodiment, it is assumed that the signal input to the target channel filter 200 has a value of −1 or 1 for convenience. The signal value may be 1 or 0. When the signal input to the target channel filter 200 has a value of 1 or 0, a total number of levels is the same but the level values are different compared to when the signal value is −1 or 1.

Referring to FIG. 9, the selection signal generator 201 determines the level of an output of the target channel filter 200 when the signal valid is a value other than 0 (S73, S75, S77), and generates a selection signal corresponding to the determined level (S74, S76, S78, S79). Then, the switch 202 receives the selection signal from the selection signal generator 201 and transmits the selection signal to one of a plurality of average value filters 204 through 207.

Figure 10A:
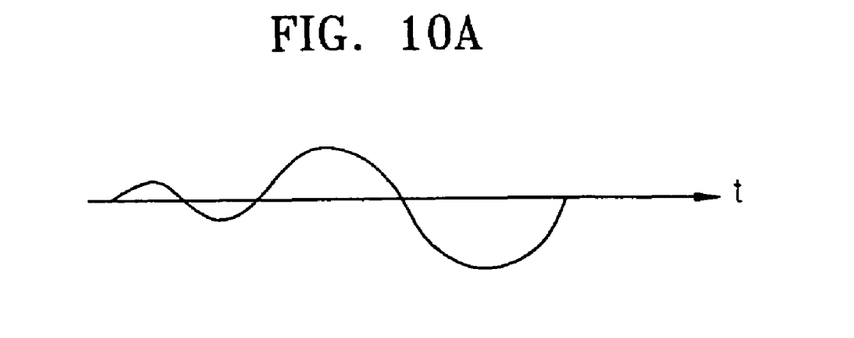
FIG. 10A is a waveform diagram of an input radio frequency (RF) signal.
Figure 10B:
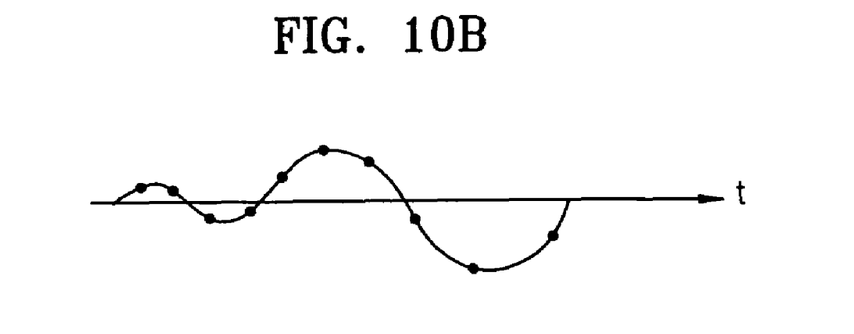
FIG. 10B is a waveform diagram of a sampled signal from which a DC offset is canceled.

FIG. 10A is a waveform diagram of an RF signal input to the binary data detecting apparatus of FIG. 1. FIG. 10B is a waveform diagram of an RF signal that is sampled by the ADC 11 and from which a DC offset is canceled by the DC offset canceller. The signal from the DC offset canceller is input to the first binarization unit 13, the FIR filter 14, and the PLL 17.

The RF signal may be sampled at a crossover point of the RF signal or a point whose phase is shifted from the crossover point by a degree of 180. The signal of FIG. 10B is sampled in the latter case.

Figure 10C:
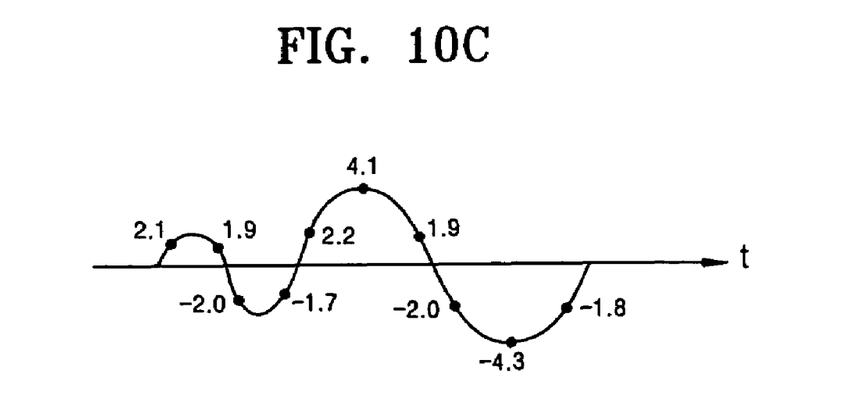
FIG. 10C is a waveform diagram of a signal output from a finite impulse response (FIR) filter.

FIG. 1C is a waveform diagram of a signal output from the FIR filter 14. When the signal of FIG. 10B passes through the FIR filter 14, a high-frequency component of the signal is amplified, outputting an amplified signal. The amplified signal output from the FIR filter 14 is input to the viterbi decoder 16. The amplified signal input to the viterbi decoder 16 may be delayed during generation of several system clocks when it passes through the FIR filter 14.

Figure 10D:
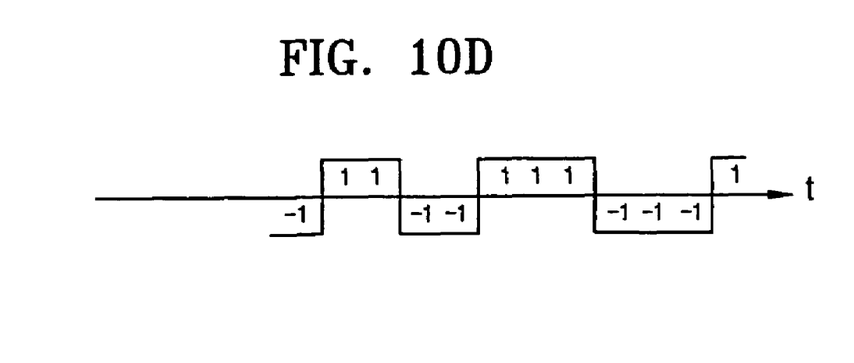
FIG. 10D illustrates values of binary data output from a viterbi decoder.

The amplified signal output from the FIR filter 14 is input to the viterbi decoder 16 or the second binarization unit 15, and output as binary data. In this embodiment, binary data is also output from the first binarization unit 13. However, it is assumed that only an output of the viterbi decoder 16 is input to the level detector 18 for convenience. FIG. 10D illustrates binary data output from the viterbi decoder 16 when the signal of FIG. 10C is input to the viterbi decoder 16.

Figure 10E:
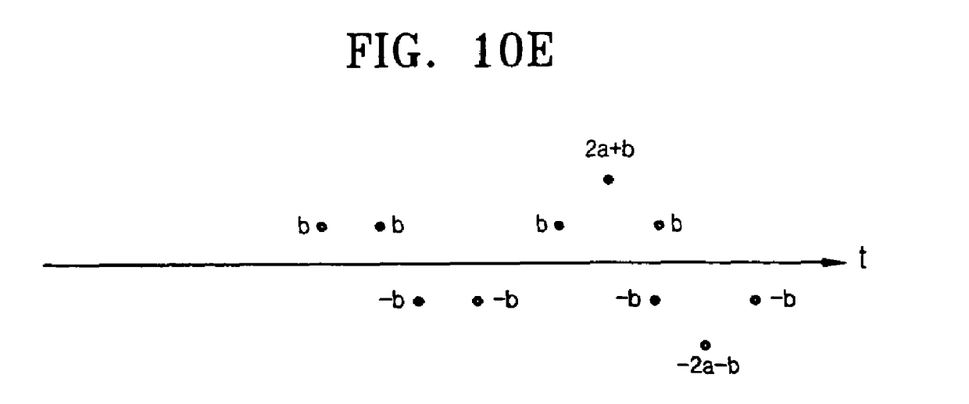
FIG. 10E illustrates levels of outputs of a target channel filter.

FIG. 10E illustrates level values of outputs of the target channel filter 200, that is, the outputs of the (a,b,a) type target channel filter 200 to which the binary data of FIG. 10D is input. For instance, when initial binary data of −1, 1, and 1 are input to the target channel filter 200, the target channel filter 200 outputs a level value b. The next level value b is obtained when binary data of 1, 1, and −1 are input to the target channel filter 200.

The level values of the outputs of the target channel filter 200, shown in FIG. 10E, are input to the selection signal generator 201. The selection signal generator 201 sequen-tially receives level values of b, b, −b, −b, b, 2a+b, b, −b, −2a−b, and −b from the target channel filter 200, generates selection signals with level values of P2, P2, P3, P3, P2, P1, P2, P3, P4, P3, respectively, and outputs one of these selection signals to the switch 202.

Figure 10F:
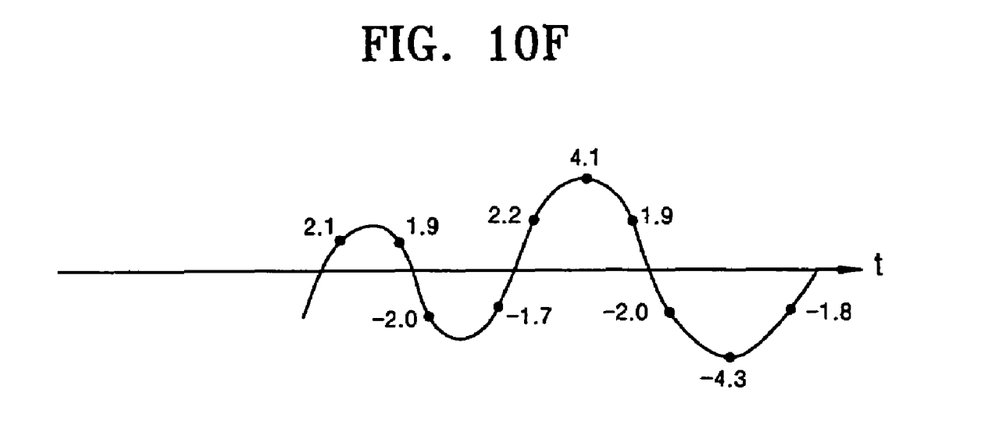
FIG. 10F is a waveform diagram of a signal input to a switch.

FIG. 10F is a waveform diagram of a signal input to the switch 202. Here, the signal is the signal of FIG. 10C that is delayed for a predetermined time. In response to the selection signal input from the selection signal generator 201, the switch 202 sends the signal of FIG. 10F to one of the plurality of average value filters 204 through 207. For instance, a signal with a size of 4.1 is input to the first average filter 204, and four signals with sizes of 2.1, 1.9, 2.2, and 1.9 are input to the second average filter 205.

Four signals with sizes of −2.0, −2.3, −2.0, and −1.8 are input to the third average value filter 206. A signal with a size of −4.3 is input to a fourth average filter (not shown). The plurality of the average value filters 2-0 through 270 receive a number of signals and output an average value of the values of the signals, the number being defined by the microcomputer.

The present invention can be embodied as a computer readable code stored in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

As described above, according to the present invention, it is possible to more precisely detect binary data from an analog signal, particularly, from a high recording density optical disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus detecting binary data from an input analog signal, comprising:
   an analog-to-digital (AD) converter converting the input analog signal into a digital signal;
   at least one binarization unit receiving the digital signal and outputting a first type and a second type of binary data;
   a viterbi decoder decoding the digital signal and outputting a third type of binary data; and
   a level detector receiving at least two of the types of binary data, synchronizing the at least two types of binary data and outputting a level value to the viterbi decoder when an output number of the synchronized at least two types of binary data, is equal to or greater than a predetermined number,
   wherein the at least two types of binary data correspond to each other on a time axis and have same values.

2. The apparatus of claim 1, wherein the level detector comprises at least one delayer synchronizing the at least two types of binary data with each other.

3. The apparatus of claim 1, wherein the level detector comprises:
a switch receiving the digital signal and switching the digital signal according to levels of digital signal values;
a target channel filter receiving one of the at least two types of binary data and outputting a predetermined level value; and
a selection signal generator controlling the switch based on the predetermined level value input from the target channel filter.

4. The apparatus of claim 3, wherein the level detector comprises at least one not exclusive OR (XOR) operation unit performing an XOR operation on values of the at least two types of binary data so as to determine whether a number of the synchronized at least two types of binary data is equal to or greater than a predetermined number.

5. The apparatus of claim 4, wherein the level detector further comprises an OR operation unit receiving an output of the at least one XOR operation unit and performing an OR operation on the received output,
and the selection signal generator controls the switch in response to a signal output from the OR operation unit.

6. The apparatus of claim 3, wherein a type of the target channel filter is the same as that of the viterbi decoder.

7. The apparatus of claim 1, wherein the viterbi decoder is an (a,b,a) type viterbi decoder.

8. The apparatus of claim 1, wherein the viterbi decoder is an (a,b,b,a) type viterbi decoder.

9. The apparatus of claim 1, wherein the viterbi decoder is an (a,b,c,b,a) type viterbi decoder.

10. A method of detecting binary data from an input analog signal, comprising:
converting the input analog signal into a digital signal;
binarizing the digital signal into first binary data;
performing viterbi decoding to detect second binary data from the digital signal;
receiving the digital signal, and the first and second binary data, and detecting a level value for the viterbi decoding when an output number from synchronizing the first and second binary data, is equal to or greater than a predetermined number.

11. The method of claim 10, wherein the detecting of the level value for the viterbi decoding comprises:
outputting a predetermined level value from one of the first and second binary data; and
switching the digital signal according to level values of the digital signal based on the predetermined level value.

12. The method of claim 11, wherein the first and second binary data are delayed and synchronized.

13. The method of claim 11, wherein the detecting of the level value for the viterbi decoding comprises performing a not exclusive OR (NXOR) operation on values of the two binary data so as to determine whether a number of the synchronized two binary data, having the same values, is equal to or greater than a predetermined value.

14. The method of claim 13, wherein the detecting of the level value for the viterbi decoding further comprises receiving a result of the NXOR operation and performing an OR operation on the result of the NXOR operation, and
the switching of the digital signal is controlled based on a result of the OR operation.

15. A method of detecting binary data from an input analog signal, comprising:
converting the input analog signal into a digital signal;
binarizing the digital signal into first binary data;
binarizing the digital signal into second binary data;
receiving the digital signal, and the first and second binary data, and detecting a level value for viterbi decoding from the digital signal when an output number of the first and second binary data, which correspond to each other on a time axis and have same values, are equal to or greater than a predetermined number; and
performing the viterbi decoding to detect the second binary data from the digital signal, using the detected level value.

16. The method of claim 15, further synchronizing the first and second binary data with each other.

17. The method of claim 15, wherein the detecting of the level value comprises:
outputting a predetermined level value from one of the first and second binary data; and
switching the digital signal according to levels of values of the digital signal based on the predetermined level value.

18. The method of claim 17, wherein the detecting of the level value for the viterbi decoding comprises performing a not exclusive OR (NXOR) operation on values of the first and second binary data so as to determine whether a number of synchronized first and second binary data is equal to or greater than a predetermined value.

19. The method of claim 18, wherein the detecting of the level value for the viterbi decoding further comprises receiving a result of the NXOR operation and performing an OR operation on the result of the NXOR operation, and
the switching of the digital signal is controlled based on a result of the OR operation.

20. A computer readable recording medium storing a program that executes a method of detecting binary data from an input analog signal, the method comprising:
converting the input analog signal into a digital signal;
binarizing the digital signal into first binary data;
performing viterbi decoding to detect second binary data from the digital signal;
receiving the digital signal, and the first and second binary data, and detecting a level value for the viterbi decoding from the digital signal when a number obtained by synchronizing the first and second binary data, is equal to or greater than a predetermined number.

21. A computer readable recording medium storing a program that executes a method of detecting binary data from an input analog signal, the method comprising:
converting the input analog signal into a digital signal;
binarizing the digital signal into first binary data;
binarizing the digital signal into second binary data;
receiving the digital signal, and the first and second binary data, and detecting a level value for viterbi decoding from the digital signal when a number obtained by synchronizing the first and second binary data is equal to or greater than a predetermined number; and
performing the viterbi decoding to detect the second binary data from the digital signal, using the detected level value.

22. The method according to claim 10, wherein the binarizing comprises:
checking a length of the input signal,
determining whether a length of the input signal is shorter than a predetermined shortest signal length; and
selecting and compensating the input signal length if determined that the input signal length is shorter than the predetermined shortest signal length.

23. A method according to claim 15, wherein the binarizing of the first and second binary data comprises:

checking a length of the input signal,
determining whether the input signal length is shorter than a predetermined shortest signal length; and
selecting and compensating the input signal length if determined that the input signal length is shorter than the predetermined shortest signal length.

24. An apparatus detecting binary data, comprising:
an analog-to-digital (AD) converter converting an input analog signal into a digital signal;
a binarization unit receiving the digital signal and outputting binarized binary data;
a viterbi decoder receiving the digital signal and outputting decoded binary data; and
a level detector receiving the digital signal, the binarized binary data and the decoded binary data, synchronizing both binary data and outputting a level value to the viterbi decoder,
wherein the level detector comprises:
a switch receiving the digital signal and switching the digital signal according to levels of digital signal values;
a target channel filter receiving one of the binary data and outputting a predetermined level value; and
a selection signal generator controlling the switch based on the predetermined level value input from the target channel filter.

25. The apparatus of claim 24, wherein the viterbi decoder is configured according to a code for the input signal.

26. The apparatus of claim 25, wherein the code is a (1, 7) or a (2, 10) code.

27. The apparatus of claim 24, wherein at least one delayer synchronizes both binary data.

28. The apparatus of claim 24, wherein the level detector comprises at least one not exclusive OR (XOR) operation unit performing an XOR operation on the synchronized binary data so as to determine whether a number of the synchronized binary data is equal to or greater than a predetermined number.

29. The apparatus of claim 28, wherein the level detector further comprises an OR operation unit receiving an output of the at least one XOR operation unit and performing an OR operation on the received output,
and the selection signal generator controls the switch in response to a signal output from the OR operation unit.

* * * * *